United States Patent Office 3,738,933
Patented June 12, 1973

3,738,933
PROCESS FOR THE REDUCTION OF THE BIO-
CHEMICAL OXYGEN DEMAND OF SEWAGE,
AND FOR THE RECOVERY OF THE INHERENT
PROTEIN
Janos Hollo, Jeno Toth, and Istvan Zagyvai, Budapest,
Hungary, assignors to Tatabanyai Szenbanyak, Tata-
banya, Hungary
No Drawing. Filed Dec. 3, 1970, Ser. No. 94,957
Claims priority, application Hungary, Dec. 15, 1969,
TA–1,035
Int. Cl. C02c 5/02
U.S. Cl. 210—53                                      4 Claims

ABSTRACT OF THE DISCLOSURE

The biochemical oxygen demand of sewage of the type of meat, dairy and fermentation waste, is reduced by adding to the sewage at least 120 g./m.$^3$ of a water soluble aluminum salt or bivalent or trivalent iron salt, 0.5 to 1 kfi./m.$^3$ of bentonite or kaolin and 5 to 10 g./m.$^3$ of polymers or copolymers of acrylic acid-acrylic amide in the form of an aqueous solution. The suspension is stirred and the pH adjusted to exceed 10 by addition of a basic calcium compound such as lime milk or calcium hydroxide. The precipitate thus obtained is separated by setting and transferred to a conical tank for treatment with carbon dioxide until the pH is no higher than 7, and the resulting precipitate is filtered and sterilized at a temperature above 130° C. under pressure, to produce a biochemical culture medium or animal feed.

The invention relates to a process for the purification of sewage, and, if required, for the recovery of the inherent protein from sewages. Sewages of the kind to be so treated are mainly found in slaughter houses, meat procesing plants, preserve factories, the milk industry, the fermentation industry and the like.

The sewages of the food industry have a very considerable biochemical oxygen demand (3,000–15,000 mg./l. BOD$_5$) as well as a significant content of mechanical impurities, i.e. of suspended organic matter. Owing to their high contamination these sewages are not suitable to be transferred directly to natural or artificial recipients, so that the dissolved and suspended organic matter content is generally first removed by means of various aerobic or anaerobic biochemical decomposition methods. These biochemical methods are lengthly and complicated; they require costly equipment, considerable power input, and significant length of time.

It is the object of the invention to provide a chemical process permitting to reduce the biochemical oxygen demand of sewages by at least one order of magnitude, ensuring a short passage of time, requiring simple equipment, an inexpensive technology, and combined, if required, with the simultaneous recovery of the protein content.

The process according to the invention is a method for the reduction of the biochemical oxygen demand of sewage, and for the recovery of protein from wastes, in which depending on the biochemical oxygen demand of the sewage to be treated at least 120 g./m.$^3$ of a water-soluble aluminium salt or a bivalent or trivalent iron salt, and, if required, 0.5 to 1 kg./m.$^3$ of bentonite or kaolin as well as 5 to 10 g./m.$^3$ of polymers and copolymers of acrylic acid-acrylic amide in the form of áqueous solution are added to the sewage, whereafter the sewage is conditioned, the pH of the sewage so treated is adjusted to exceed 10 by means of adding a basic calcium compound, the protein-containing precipitate so obtained is separated from the clarified water in a settling tank, the pH of the precipitate is adjusted by means of carbon dioxide to 7 or below, if required, and after dehydration the precipitate is sterilized at temperatures above 130° C. under pressure and is further processed together with other waste proteins.

The precipitated content of the sludge, the volume of which is about 6% of the volume of the sewage is saturated with carbon-dioxide and its pH is adjusted to 7 or less, then dehydrated. After discharging the bulk of the water, the precipitate is sterilized at temperatures above 130° C. under pressure. The product so obtained is processed in a manner known per se, together with other waste proteins into biochemical culture medium concentrates, or into animal feed.

The process according to the invention may be performed within 1 to 1.5 hours with the remarkable result that a sewage having a BOD$_5$ of 4,000 to 11,000 mg./l. and containing a large amount (4,000 to 10,000 mg./l.) of suspended solid matter are obtained practically free of contaminations, that is, containing only about 200 mg./l. of impurities and with a BOD$_5$ value of 300 to 400 mg./l. A further advantage of the process is the possibility of recovering the protein contained in the sewage, which may be processed together with the other waste proteins, into a biochemical culture medium or an animal feed. The process is not sensitive to a variation of the sewage composition, it does not require costly and voluminuous equipment, and may be performed with high efficiency and intensity, using inexpensive chemicals. This process is based on a combined application of various chemicals, and it is particularly surprising on account of the hitherto accepted view that chemical methods do not lend themselves for the processing of protein-containing, and other wastes, precisely owing to the high cost of chemical methods.

In the implementation of the invention an aqueous solution of aluminium sulphate or bivalent and trivalent iron salts, and, if required, a suspension of clay or bentonite, as well as an aqueous solution of an acrylic acid-acrylic amide polymer of copolymer are added to the sewage with mild stirring. As water soluble polymer or copolymer of acrylic acid or acrylic amide a commercial grade product having a molecular weight more than 600,000, preferably more than one million is used. After a short length of time the chemically treated sewage is transferred to another container where it is adjusted to a pH over 10 by means of a basic calcium compound, preferably lime milk, or powdered calcium hydrate. The amount of basic calcium compounds to be used depends on the composition of the sewage. The alkalinized sewage is now conditioned for a few minutes with mild stirring, and then transferred to a settling tank, which is conveniently provided at its upper part with an overflow through construction for the purpose of the uniform discharge of the clarified water, and with a sucking or discharge device for the continuous removal of the precipitated sludge at its bottom.

The condensed precipitate obtained in the settling tank is transferred to another tank of a 30° to 45° conicity, where it is saturated with carbon dioxide. It is advisable to keep the pH of the suspension at least 7 or at a slightly acidic value during the carbon dioxide treatment. After allowing the suspension to stand for a minute or two, the precipitate is dehydrated on a vacuum filter or some other device suitable for separating the solids phase, e.g. a separator. The dehydrated precipitate is sterilized at temperatures exceeding 130° C. under pressure. The product so obtained may be utilized in a manner known per se together with other waste proteins as biochemical culture medium or animal feed.

The results to be achieved by means of the process according to the invention are shown in the following table.

| Number of sample | Untreated water (Milligrams per liter) | | Chemical | Treated water (Milligrams per liter) | |
|---|---|---|---|---|---|
| | $BOD_5$ | Suspended matter | | $BOD_5$ | Suspended matter |
| 1 | 3,760 | 2,230 | 250 (1) 400 (2) | 420 | 230 |
| 2 | 4,080 | 3,520 | 250 (1) 400 (2) | 439 | 240 |
| 3 | 3,021 | 2,920 | 200 (1) 400 (2) | 363 | 180 |
| 4 | 2,008 | 1,820 | 200 (1) 400 (2) | 412 | 220 |
| 5 | 1,273 | 820 | 150 (1) 400 (2) | 418 | 190 |
| 6 | 1,270 | 870 | 150 (3) 400 (2) | 430 | 210 |
| 7 | 3,370 | 2,900 | 250 (3) 450 (2) | 421 | 230 |
| 8 | 5,279 | 4,200 | 280 (3) 600 (2) | 412 | 260 |
| 9 | 6,047 | 5,300 | 280 (3) 650 (2) | 396 | 240 |
| 10 | 6,121 | 4,730 | 380 (3) 650 (2) | 386 | 250 |
| 11 | 7,220 | 6,620 | 150 (1) / 300 (4) / 5 (5) } 300 (2) | 390 | 170 |
| 12 | 8,440 | 7,200 | 100 (3) / 200 (4) / 6 (5) } 350 | 410 | 190 |

$BOD_5$ is the amount of dissolved oxygen which a sewage consumes when incubated for 5 days at 20° C.

NOTE.—The numerals used in the above table indicate the following chemicals: (1)=aluminium sulphate; (2)=calcium hydrate; (3)=ferric chloride; (4)=bentonite; (5)=acrylic acid-acrylic amide as polymer having a molecular weight about one million).

What we claim is:

1. A process for reducing the biochemical oxygen demand of sewage of the type of meat, milk and fermentation waste, comprising adding to the sewage at least 120 g./m.$^3$ of a water-soluble salt whose cation is selected from the group consisting of aluminum, bivalent iron and trivalent iron, adding to the sewage with said water-soluble salt 0.5 to 1 kg./h.$^3$ of a member selected from the group consisting of bentonite and kaolin and 5 to 10 g./m.$^3$ of an aqueous solution of a member selected from the group consisting of polymers and copolymers of acrylic acid-acrylic amide, then adding to the sewage a basic calcium compound until the pH of the sewage exceeds 10, separating a precipitate from the sewage, and contacting the separated precipitate with carbon dioxide until the pH of the precipitate is no higher than 7.

2. A process as claimed in claim 1, and thereafter dehydrating the precipitate and sterilizing the precipitate at a temperature above 130° C. under pressure.

3. A process as claimed in claim 1, in which said basic calcium compound is selected from the group consisting of lime milk and calcium hydroxide.

4. A process as claimed in claim 1, in which said aluminum salt is aluminum sulphate, said bivalent iron salt is ferrous sulphate and said trivalent iron salt is selected from the group consisting of ferric sulphate and ferric chloride.

References Cited
UNITED STATES PATENTS

| | | | |
|---|---|---|---|
| 966,196 | 8/1910 | Goodman | 210—53 |
| 2,074,082 | 3/1937 | Domogalla | 210—53 |
| 1,263,532 | 4/1918 | Cummings | 210—42 |
| 3,491,080 | 1/1970 | Ehrensvard et al. | 260—112 R |
| 3,171,804 | 3/1965 | Rice | 210—53 |
| 3,462,275 | 8/1969 | Bellamy | 210—11 X |
| 2,254,241 | 9/1941 | Pittman et al. | 260—112 R |
| 1,015,857 | 1/1912 | Vasey | 260—112 R |

MICHAEL ROGERS, Primary Examiner

U.S. Cl. X.R.

99—2; 260—112